United States Patent [19]
Shirai et al.

[11] Patent Number: 5,428,510
[45] Date of Patent: Jun. 27, 1995

[54] MOTOR VEHICLE HEADIGHT INCLUDING DEVICE FOR MEASURING DEVIATION AND ADJUSTING DIRECTION OR ORIENTATION OF HEADLIGHT BEAM

[75] Inventors: Katutada Shirai; Hideharu Mochizuki, both of Shizuoka, Japan

[73] Assignee: Koito Manufacturing Co., Ltd., Tokyo, Japan

[21] Appl. No.: 894,349

[22] Filed: Jun. 4, 1992

Related U.S. Application Data

[60] Continuation of Ser. No. 696,910, May 6, 1991, Pat. No. 5,138,532, which is a division of Ser. No. 370,949, Jun. 23, 1989, Pat. No. 5,121,303.

[30] Foreign Application Priority Data

Jun. 24, 1988 [JP] Japan ................................ 63-154630
Jul. 19, 1988 [JP] Japan ................................ 63-178033

[51] Int. Cl.[6] ............................................. F21M 3/70
[52] U.S. Cl. .............................. 362/66; 362/80; 362/289
[58] Field of Search ................ 362/61, 66, 80, 287, 362/428, 427, 285, 289, 418, 419; 33/365, 370, 288, 333, 375, 282, 285, 376

[56] References Cited

U.S. PATENT DOCUMENTS

| | | |
|---|---|---|
| 3,047,958 | 12/1959 | Dorbin . |
| 3,731,706 | 6/1973 | Ricard . |
| 4,794,495 | 12/1988 | McMahan et al. . |
| 4,802,067 | 1/1989 | Ryder et al. . |
| 4,916,583 | 4/1990 | Nagasawa ................... 362/61 |
| 4,922,387 | 5/1990 | Ryder et al. ................ 362/419 |
| 4,970,629 | 11/1990 | McMahan .................... 362/419 |
| 4,984,136 | 1/1991 | Yamagishi et al. ......... 362/66 |
| 5,016,155 | 5/1991 | Chevance .................... 362/66 |
| 5,032,964 | 7/1991 | Endo et al. ................ 362/61 |
| 5,077,642 | 12/1991 | Lisak .......................... 362/66 |

*Primary Examiner*—Richard R. Cole
*Attorney, Agent, or Firm*—Sughrue, Mion, Zinn, Macpeak & Seas

[57] ABSTRACT

A headlight for a motor vehicle incorporation devices for measuring the amount of deviation of the beam of light produced thereby from the desired axis. The first deviation measuring device, which is used for measuring the amount of deviation of the beam in the horizontal direction, includes a calibrated rod extending between either the reflector and the headlight body, in the case of a movable reflector type headlight, or between the vehicle body and the headlight body, in the case of a movable unit type headlight. The second deviation measuring device, which is used for measuring the amount of deviation in the vertical direction, includes a level secured to the reflector or headlight body.

8 Claims, 10 Drawing Sheets

MOTOR VEHICLE HEADIGHT INCLUDING DEVICE FOR MEASURING DEVIATION AND ADJUSTING DIRECTION OR ORIENTATION OF HEADLIGHT BEAM

This is a continuation of application Ser. No. 07/696,910 filed May 6, 1991, now U.S. Pat. No. 5,138,532 which is a divisional of application Ser. No. 07/370,949 filed Jun. 23, 1989 now U.S. Pat. No. 5,121,303.

BACKGROUND OF THE INVENTION

The present invention relates to a motor vehicle headlight having a device for measuring the amount of deviation of the light beam from the headlight in vertical and horizontal directions from a proper aiming direction.

A headlight is generally provided with an aiming mechanism for rotatably adjusting the headlight about prescribed horizontal and vertical axes to adjust the direction of the optical axis of the headlight in such a manner as to align the light beam therefrom in a prescribed range. For this adjustment, the headlight is lit in a dark room, and the light beam from the headlight is shone onto a screen placed at a prescribed distance therefrom. The headlight is then adjusted until the beam on the screen is at a prescribed position.

For this adjustment, much equipment, such as a large dark room and screen, is required. Moreover, it is time consuming to perform the adjustment because it is necessary to align the spot of the light beam while looking at the screen.

Headlights used in the United States have three location bosses, which define measurement reference surfaces, projecting from the front lens of the headlight. To perform headlight alignment, a measuring instrument called an "aimer" is set in contact with the location bosses to first determine whether or not the headlight is inclined relative to a horizontal plane. The headlight is attached to the motor vehicle in such a manner that the front surfaces of the location bosses, which are the measurement reference surfaces, extend vertically when the vehicle is on a horizontal surface. When the measuring instrument is set in contact with the vertically extending front surfaces of the location bosses, the amount of inclination of the headlight relative to the horizontal plane is measured. It is required that the measured value be within a prescribed range.

To be able to carry out such measurements, every headlight used in the United States must have the above-described location bosses. However, different alignment techniques are used in most other countries. For that reason, headlights for U.S. use must be manufactured separately and differently from those to be used in Japan, Europe, etc. This is troublesome and expensive.

SUMMARY OF THE INVENTION

The present invention was made in order to solve the above-discussed problems. Accordingly, it is an object of the present invention to provide a motor vehicle headlight having a device for measuring the amount of deviation of the orientation of the headlight without requiring equipment such as a dark room, screen or aimer, yet which has a simple construction and with which it can be easily confirmed whether or not the direction of the light beam from the headlight deviates from the proper direction, and any deviation corrected.

There are generally two types of headlights for motor vehicles. One is the movable reflector type in which a reflector, provided in the body of the headlight separately from the body, can be swingably moved for adjustment. The other of the headlight types is the movable unit type in which a reflector is integrally provided on the inside spherical surface of the body of the headlight and the body can be swingably moved for adjustment.

A device provided in accordance with the present invention for measuring the amount of deviation of the orientation of a headlight of the movable reflector type is characterized by comprising a first deviation measuring unit which includes support means projecting from the outside surface of the body of the headlight and a rod supported by the support means, extending through the wall of the body of the headlight, and contacting the rear surface of the reflector at one end of the rod under a spring force so as to be slide in the axial direction thereof depending on the rightward or leftward deviation of the orientation of the headlight, the amount of rightward or leftward deviation being measured in terms of the position of the rod relative to the body of the headlight; and a second deviation measuring unit which includes a body having a reflector-supported portion of the same form as the reflector-supported portion of the base of an electric bulb unit attached to the reflector, and a level supported by the body of the second deviation measuring unit, the second deviation measuring unit being attachable to the reflector in place of the electric bulb unit in order to measure the amount of upward or downward deviation of the orientation of the headlight.

In accordance with another aspect of the invention, a device for measuring the amount of deviation of the orientation of a headlight of the movable unit type is characterized by comprising a first deviation measuring unit which includes support means projecting from the headlight attaching surface of the body of the motor vehicle, and a rod supported by the support means and contacting the outside surface of the body of the headlight at one end of the rod under a spring force so as to be slid in the axial direction thereof depending on the rightward or leftward deviation of the orientation of the headlight, the amount of rightward or leftward deviation being measured in terms of the position of the rod relative to the headlight attaching surface; and a second deviation measuring unit which includes a body having a body-supported portion of the same form as the body-supported portion of the base of an electric bulb unit attached to the body of the headlight, and a level supported by the body of the second deviation measuring unit, the second deviation measuring unit being attachable to the body of the headlight in place of the electric bulb unit in order to measure the amount of upward or downward deviation of the orientation of the headlight.

In the device provided in accordance with the present invention for measuring the amount of deviation of the orientation of the headlight of the movable reflection type, the amount of deviation of the orientation of the reflector corresponds to the axial displacement of the rod of the first deflection measuring unit so that the quantity of the deviation can be determined from the position of the rod relative to the body of the headlight. When the second deviation measuring unit is attached to the reflector instead of the electric bulb unit, the amount of upward or downward deviation of the orientation of the reflector can be determined with the level.

In the device provided in accordance with the present invention for measuring the amount of deviation of the orientation of the headlight of the movable unit type, the amount of rightward or leftward deviation of the orientation of the body of the headlight corresponds to the amount of axial displacement of the rod of the first deviation measuring unit, and hence the amount of rightward or leftward deviation can be determined from the position of the rod relative to the headlight mounting surface of the body of the motor vehicle. When the second deviation measuring unit is attached to the body of the headlight in place of the electric bulb unit, the amount of upward or leftward deviation of the orientation of the body of the headlight can be determined with the level.

The values measured by the first and second deviation measuring units of each of the devices can be easily made zero by the aiming adjustment of the headlight so as to correct any measured deviation of the orientation of the headlight.

Further, the invention provides a device for adjusting the direction of the light beam from a headlight of the movable reflector type comprising a light beam direction adjusting mechanism by which a reflector provided in the body of the headlight is swung rightward, leftward, upward and/or downward to adjust the direction of the light beam from the headlight; a first deviation measuring unit including a support member provided at the inside surface of the headlight body and a rod which is supported by the support member so as to be slidable backward and forward in the axial direction thereof and which is urged into contact with the rear surface of the reflector at the front end of the rod by a spring so as to be slid forward or backward in the axial direction of the rod depending on the amount of rightward or leftward swing of the reflector to thereby measure the amount of rightward or leftward deviation of the orientation of the reflector in terms of the position of the rod relative to the headlight body; and a second deviation measuring unit which is a level secured to the reflector to measure the upward or downward deviation of the orientation of the reflector. The first and the second deviation measuring units are disposed in such a manner that the deviation amount reading areas (scales) of the units are located at the upper portion of the reflector and face the upper part of the peripheral portion of the front lens of the headlight.

Yet further, the invention provides a device for adjusting the direction of the light beam from a headlight of the movable unit type comprising a light beam direction adjusting mechanism by which the body of the headlight, the inside curved surface of which includes a light reflecting surface, is swung rightward, leftward, upward and/or downward to adjust the direction of the light beam from the headlight; a first deviation measuring unit including a support member provided at the headlight mounting surface of the body of the vehicle and a rod which is supported by the support member so as to be slidable backward and forward in the axial direction thereof and which is urged into contact with the rear surface of the headlight body at the front end of the rod by a spring so as to be slid forward or backward in the axial direction of the rod depending on the amount of rightward or leftward swing of the headlight body to thereby measure the rightward or leftward deviation of the orientation of the headlight body in terms of the position of the rod relative to the headlight mounting surface of the vehicle body; and a second deviation measuring unit which is a level secured to the headlight body to measure the upward or downward deviation of the orientation of the headlight body. The first and second deviation measuring units are disposed in such a manner that the quantity reading areas (scales) of the units are located at the upper portion of the headlight body.

In the above device provided in accordance with the present invention for adjusting the direction of the light beam from the headlight of the movable reflector type, the rightward or leftward deviation of the orientation of the reflector corresponds to the axial displacement of the rod of the first deviation measuring unit so that the amount of rightward or leftward deviation can be determined in terms of the position of the rod relative to the body of the headlight. The amount of upward or downward deviation of the orientation of the reflector corresponds to the amount of axial displacement of the bubble of the level, which is the second deviation measuring unit, and hence the quantity of upward or downward deviation is indicated by the position of the bubble. The first and the second deviation measuring units are provided at the upper portion of the reflector so that the deviation quantity reading areas of the units can be easily seen through the front lens of the headlight. The direction of the light beam from the headlight is adjusted by swingably adjusting the reflector rightward, leftward, upward and/or downward to place the graduation of the first deviation measuring unit and/or the graduation of the second deviation measuring unit into prescribed positions.

In the above device for adjusting the direction of the light beam from the headlight of the movable unit type, the amount of rightward or leftward deviation of the orientation of the body of the headlight corresponds to the amount of axial displacement of the rod of the first deviation measuring unit so that the quantity of the rightward or leftward deviation is indicated in terms of the position of the rod relative to the headlight mounting surface of the body of the vehicle. The amount of upward or downward deviation of the orientation of the body of the headlight corresponds to the amount of axial displacement of the bubble of the level, which is the second deviation measuring unit, so that the amount of upward or downward deviation is indicated in terms of the position of the bubble. The first and the second deviation measuring units are disposed at the upper portion of the body of the headlight so that the deviation quantity reading areas of the units can be easily seen. The direction of the light beam from the headlight is adjusted by swinging the body of the headlight rightward, leftward, upward and/or downward to place the graduation of the first deviation measuring unit and/or the graduation of the second deviation measuring unit into prescribed positions.

DESCRIPTION OF THE PREFERRED EMBODIMENTS

Preferred embodiments of the present invention are hereafter described with reference to the attached drawings.

Figure 1:
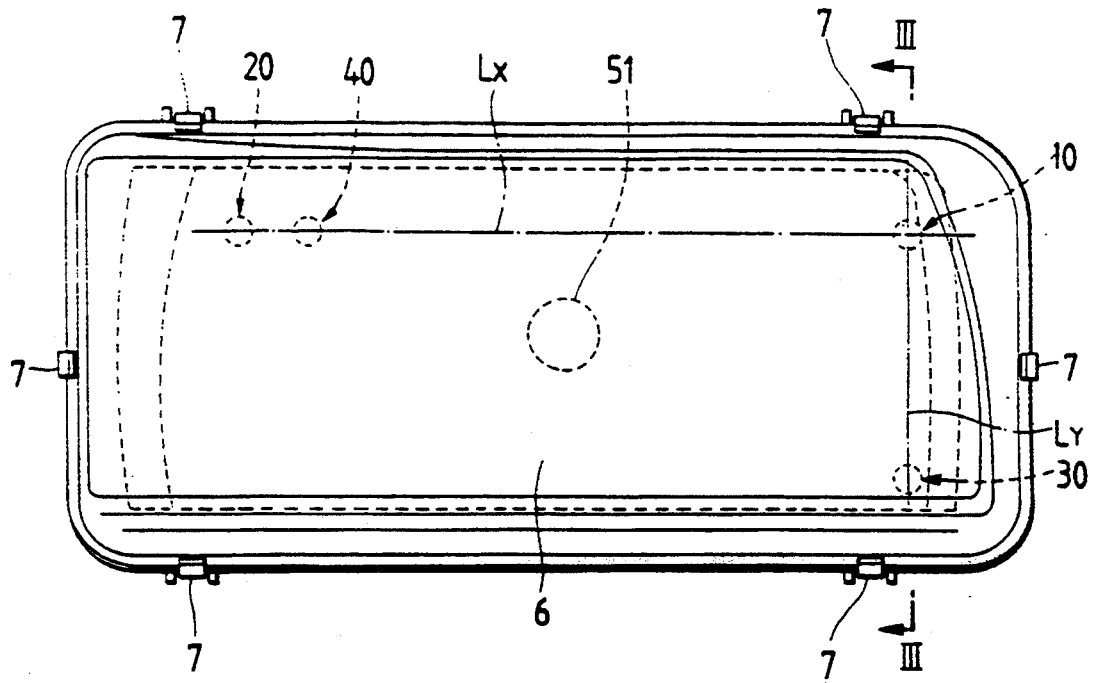
FIG. 1 is a front view of a headlight of the movable reflector type.
Figure 2:
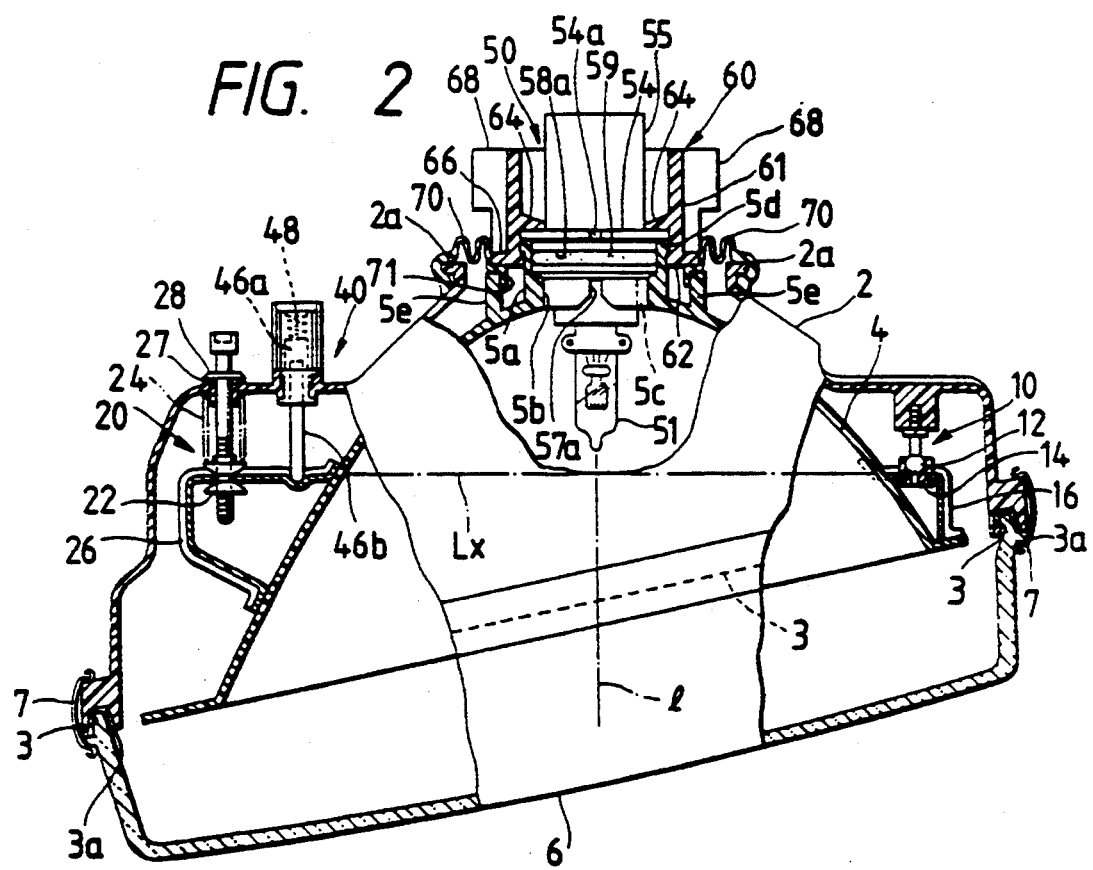
FIG. 2 is a cutaway plan view of the headlight of FIG. 1.
Figure 3:
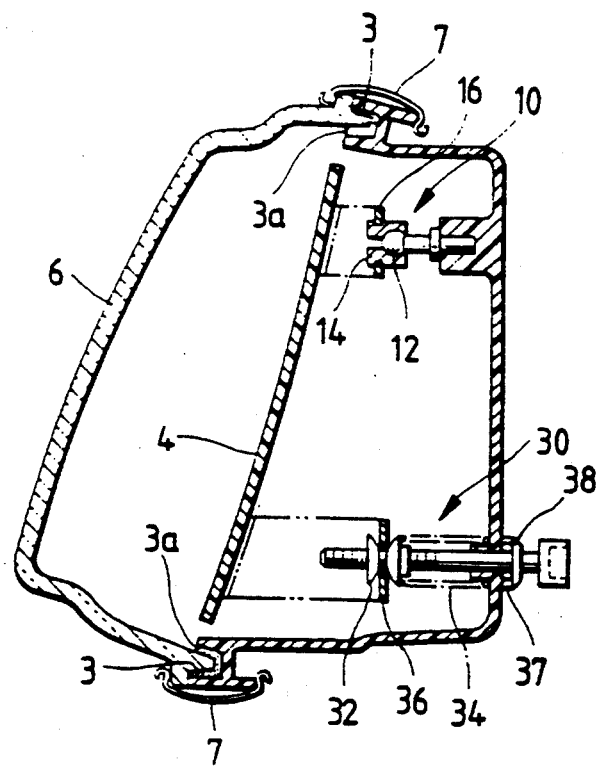
FIG. 3 is a sectional view of the headlight taken along a line III—III shown in FIG. 1.
Figure 4:
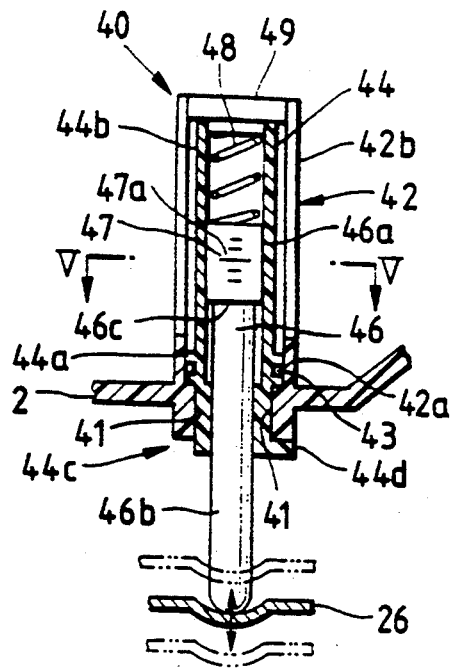
FIG. 4 is a horizontal sectional view of a first deviation measuring unit of a deviation measuring device of a first embodiment of the present invention.
Figure 6:
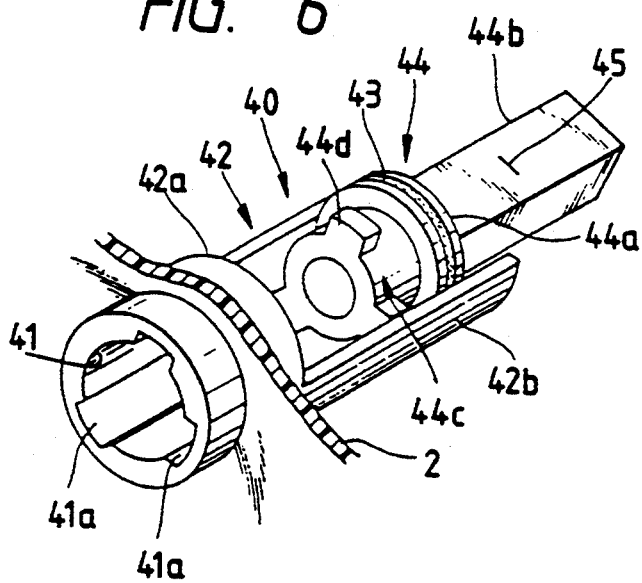
FIG. 6 is a perspective view of the measuring unit.
Figure 5:
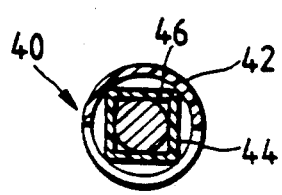
FIG. 5 is a sectional view of the measuring unit taken along a line V—V in FIG. 4.
Figure 7:
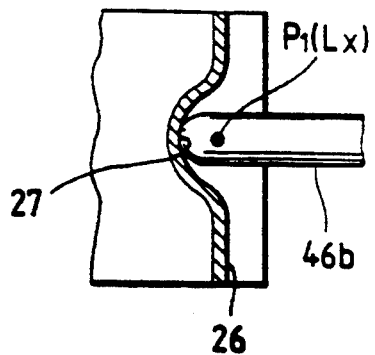
FIG. 7 is a vertical sectional view of a contact surface of the front end of the rod of the measuring unit.
Figure 8:
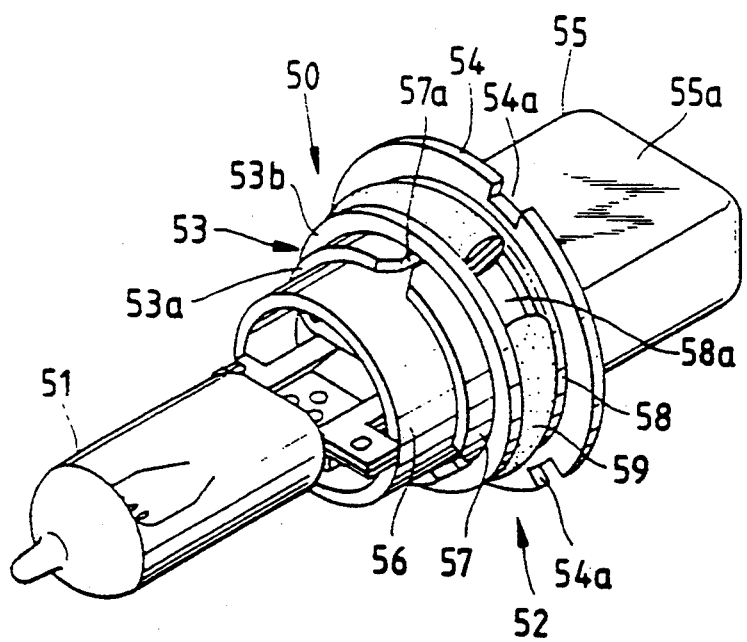
FIG. 8 is a perspective view of the electric bulb unit of the headlight.
Figure 9:
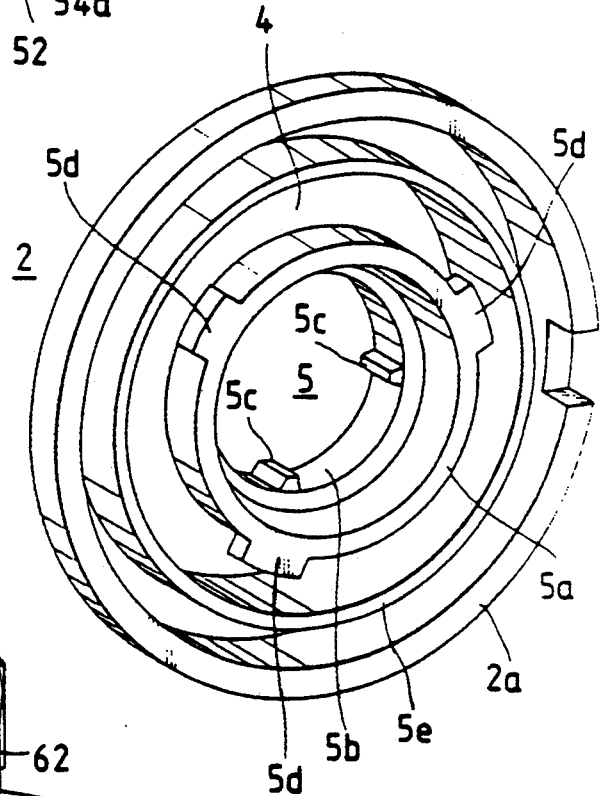
FIG. 9 is a perspective view of the bulb unit hole of the headlight and the region in the vicinity thereof.
Figure 10:
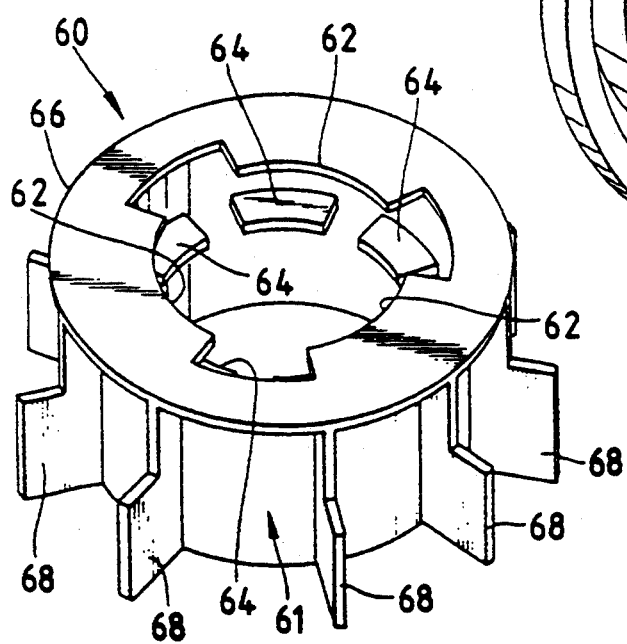
FIG. 10 is a perspective view of the locking cap of the headlight.
Figure 11:
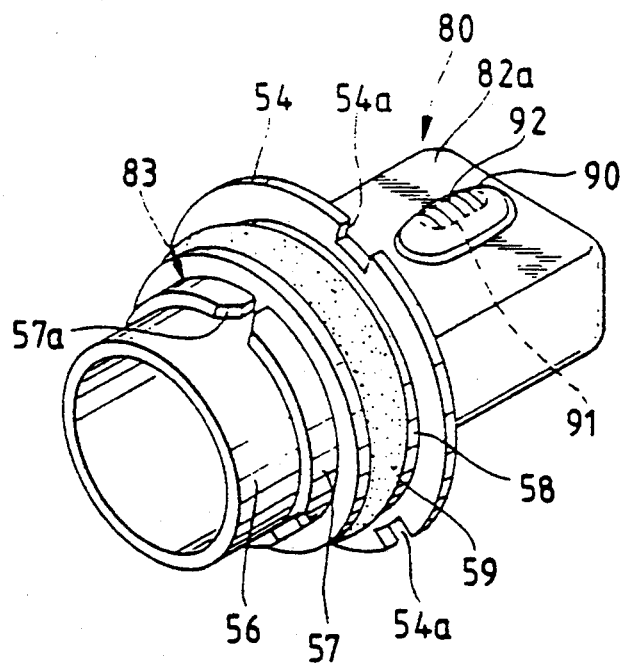
FIG. 11 is a perspective view of a second deviation measuring unit of the device.

FIGS. 1-11 show a deviation measuring device constructed according to a first embodiment of the invention. FIG. 1 is a front view of a headlight of the movable reflector type and to which a first deviation measuring unit of the device is attached. FIG. 2 is a horizontal sectional view of the headlight. FIG. 3 is a vertical sectional view of the headlight. FIG. 4 is a horizontal sectional view of the first measuring unit. FIG. 5 is a vertical sectional view of the first measuring unit. FIG. 6 is a perspective view of the first measuring unit in the state of being assembled in the device. FIG. 7 is a vertical sectional view of a surface with which the front end of the rod of the unit comes into contact. FIG. 8 is a perspective view of the electric bulb unit of the headlight. FIG. 9 is a perspective view of the bulb unit hole of the headlight and the region in the vicinity of the hole. FIG. 10 is a perspective view of the locking cap of the headlight. FIG. 11 is a perspective view of the second deviation measuring unit of the device.

As shown in FIGS. 1, 2 and 3, the headlight has a body 2 in which a reflector 4 is provided. A front lens 6 is fitted to the rectangular front opening of the body. As shown in FIGS. 2 and 3, the reflector 4 is supported at three points by a ball joint 10 and adjusting screws 20 and 30. The reflector 4 is supported a the ball 12 of the ball joint 10 on the headlight body 2 so that the reflector can be swung about the joint. The adjusting screws 20 and 30 are rotatably supported by the headlight body 2 and engaged with nuts 22 and 32 at the side of the reflector 4 so that the screws can be turned to be moved backward and forward along the nuts to change the orientation of the reflector. The ball 12 of the ball joint 10 is fitted in a socket member 14 secured to a bracket 16 fixed to the rear of the reflector 4. Other brackets 26 and 36 are secured to the rear of the reflector 4 and support the nuts 22 and 32 engaged with the adjusting screws 20 and 30. Compressed coil springs 24 and 34, O-rings 27 and 37 and flanges 28 and 38 projecting from the adjusting screws 20 and 30 are further provided.

The point of support of the reflector 4 by the adjusting screw 20, which coincides with the joint of engagement of the screw and the nut 22, is located on a horizontal axis $L_x$ perpendicular to the optical axis 1 of the headlight and extending through the ball joint 10. The point of support of the reflector 4 by the other adjusting screw 30, which coincides with the point of engagement of the screw and the nut 32, is located on a vertical axis $L_y$ perpendicular to the optical axis 1 and extending through the ball joint 10. Thus, the reflector 4 can be swung about the vertical axis $L_y$ by turning the adjusting screw 20 to adjust the orientation of the reflector rightward or leftward, and hence the direction of the light beam from the headlight rightward or leftward. Also, the reflector 10 can be swung about the horizontal axis $L_x$, perpendicular to the vertical axis, by turning the other adjusting screw 30 to adjust the orientation of the reflector upward or downward, and hence the direction of the light beam upward or downward.

As shown in FIGS. 1, 2 and 3, the body 2 of the headlight has a sealing groove 3 around the front opening of the body, the peripheral portion of the front lens 6 is engaged in the groove, a sealing agent 3a is filled in the groove, and a clip 7 is fitted on the front lens and the headlight body to clamp them to one another.

Shown at 40 in FIGS. 1, 2, 4, 5, 6 and 7 is the first deviation measuring unit for measuring the amount of rightward or leftward deviation of the orientation of the reflector 4, that is, the amount of rightward or leftward deviation of the direction of the light beam from the proper aiming direction. The outer cylindrical casing 42 of the unit 40 is provided on the headlight body 2 at a hole 41 provided in the headlight body projecting therefrom. The outer casing 42 has a cylindrical portion 42a extending from the headlight body 2 and a semicylindrical portion 42b located below the axis of the casing. The inner cylindrical transparent casing 44 of the unit 50 is provided in the outer casing 42 and extends through the wall of the headlight body 2. The portion 44b of the inner casing 44, which corresponds to the semicylindrical portion 42b of the outer casing 42, is shaped as a tube of rectangular cross section. A portion 44a of the inner casing 44, which corresponds to the cylindrical portion 42a of the outer casing 42, is provided with a disk-shaped flange 44a. An O-ring 43 is fitted on the peripheral surface of the flange to seal the gap between the inner and the outer casings 44 and 42. The other portion 44c of the inner casing 44, which corresponds to the cylindrical portion 42a of the outer casing 42, is a small cylindrical portion fitted in the hole 41 of the headlight body 2 and is provided with three engagement projections 44d on the outside circumferential surface of the small cylindrical portion at the front end thereof.

When the inner casing 44 is to be secured to the headlight body 2, the engagement projections 44d are put into the engagement recesses 41a of the inside circumferential surface of the headlight body around the hole 41, the inner casing 44 is inserted into the hole to move the projections out of the recesses into the interior of the headlight body, and the inner casing is finally turned.

The portion 44b shaped as a tube of rectangular cross section is marked with a reference line 45 on the top of the portion as shown in FIG. 6. As shown in FIG. 4, the stepped rod 46 of the first deviation measuring unit 40 is fitted in the inner casing 44 so that the rod is slidable in the axial direction thereof. A compressed coil spring 48 is interposed between the end face of the large-diameter portion 46a of the rod 46 and an end plate 49 and urges the rod so that the small-diameter portion 46b of the rod is held in contact with the bracket 26 disposed behind the reflector 4. As shown in FIGS. 1 and 2, the stepped rod 46 extends parallel to the optical axis 1 and perpendicularly to the horizontal axis $L_x$. The point of contact of the small-diameter portion 46b of the rod 46 with the bracket 26 is located near the horizontal axis $L_x$. If the position of the bracket 26 secured to the reflector 4 is changed, that of the stepped rod 46 is altered in the axial direction thereof in proportion to the amount of the displacement of the reflector. The rod 46 is provided with graduations 47 as shown in FIG. 4, so that a reference graduation 47a, which is one of the graduations 47, is coincident with the reference line 45 on the inner casing 44 when the reflector 4 is properly positioned such that the orientation of the reflector, that is, the optical axis of the reflector, does not deviate rightward nor leftward from the desired direction or orientation. For that reason, the amount of rightward or leftward deviation of the orientation of the reflector 4, namely, the amount of rightward or leftward deviation of the direction of the light beam from the headlight, can be determined from the difference between the reference graduation 47a on the rod 46 and the reference line 45 on the inner casing 44.

As shown in FIG. 7, the portion 27 of the surface of the bracket 26, which is in contact with the front end of the small-diameter portion 46b of the stepped rod 46, is a spherical surface, the center of curvature of which is coincident with the point $P_1$ of intersection of the axis of the rod and the horizontal axis $L_x$. The surface of the front end of the bracket 26 is also a spherical surface corresponding to that of the bracket 26 so that the position of the rod 46 in the axial direction thereof is not affected by swinging the reflector 4 about the horizontal axis $L_x$ to adjust the direction of the light beam upward or downward. For that reason, the graduations 47 of the first deviation measuring unit 40 are not displaced by the upward or downward swinging movement of the reflector 4 for adjustment, but are displaced by the rightward or leftward swing of the reflector. The front end 46c of the large-diameter portion 46a of the stepped rod 46 acts as a stopper to prevent the rod from coming off the headlight body 2.

As shown in FIGS. 2, 8 and 9, the electric bulb unit 50 is fitted in the bulb unit hole 5 of the rear portion of the reflector 4. The bulb unit hole 5 is defined by a rear annular part 5a surrounding the hole, a front annular part 5b surrounding the hole, and three inner projections 5c provided on the inside circumferential surface of the front annular part. Outer projections 5d are provided on the outside circumferential surface of the rear annular part 5a at the rear end thereof to secure the locking cap 60. The electric bulb unit 50 includes an electric bulb 51, which produces the light beam, and a base 52 holding the bulb and having a cylindrical body 53 made of a synthetic resin and provided with a flange 54 extending along the circumference of the body. The base 52 also has a connector 55 extending from the rear of the flange 54. The top of the connector 55 is a horizontal surface 55a. Terminals (not shown in the drawings) project within the connector 55. The bulb 51 and the base 52 are cylindrically shaped, except for the connector 55. The base body 53 has a front portion 56 of small diameter and an intermediate portion 57 of middle diameter, which have outside circumferential surfaces 53a and 53b different in diameter from each other. The base body 53 also has a rear portion 58 of large diameter. The portions 56, 57 and 58 of the base body 53 are held in the bulb unit hole 5. The intermediate portion 57 has longitudinal slits 57a into which the inner projections 5c provided around the bulb unit hole 5 are engaged in the axial direction thereof. The rear portion 58 has an annular groove 58a in which an O-ring 59 is fitted.

When the electric bulb unit 50 is to be fitted in the bulb unit hole 5 of the reflector 4, the circumferential positions of the longitudinal slits 57a of the intermediate portion 57 are made coincident with those of the inner projections 5c located around the bulb unit hole, and the bulb unit is then pushed into the hole until the flange 54 comes into contact with the rear end of the rear annular part 5a to position the bulb unit. At that time, the gap between the rear annular part 5a and the bulb unit 50 is sealed by the O-ring 59. The flange has notches 54a whose circumferential positions coincide with those of the longitudinal slits 57a. The circumferential positions of the notches 54a are made coincident with those of the inner projections 5c to make it possible to insert the bulb unit 50 into the bulb unit hole 5 to locate the bulb unit at the proper position.

The locking cap 60 shown in FIGS. 2 and 10, which secures the electric bulb unit 50 in the bulb unit hole 5 of the reflector 4, has a cylindrical portion 61 which is fitted on the outside circumferential surface of the rear annular part 5a surrounding the bulb unit hole 5. The locking cap 60 has flange pushers 64 projecting inward from the inside circumferential surface of the axially intermediate part of the cylindrical portion in the radial direction thereof and located at prescribed intervals in the circumferential direction thereof. The cylindrical portion 61 has sliding projections 62 located at the front end of the inside circumferential surface of the cylindrical portion and engaged with the outer projections 5d provided on the outside circumferential surface of the rear annular part 5a. After the electric bulb unit 50 is inserted into the bulb unit hole 5, the locking cap 60 is placed around the rear annular part 5a and turned so that the sliding projections 62 are engaged with the outer projections 5d. As a result, the flange 54 of the body 53 of the base 52 of the bulb unit 50 is clamped by the flange pushers 64 and the projecting end of the rear annular part 5a so that the bulb unit is secured in the bulb unit hole 5.

As shown in FIGS. 2 and 9, another annular part 5e projects from the annular part 5a of the reflector 4. An annular rubber cover 70 is provided between the annular part 53 and the rear open end 2a of the headlight body 2 to close the gap between the reflector 4 and the rear end of the headlight body. When the locking cap 60 is attached to the headlight body 2, an outer flange 66 provided on the cap at the rear end thereof pushes the radially inner portion of the rubber cover 70 onto the rear end of the annular part 5e to prevent problems such as rainwater or the like entering into the headlight body 2 from the rear. Ribs 68 radially project from the outside circumferential surface of the cylindrical portion 61 of the locking cap 60, which can be used as grips to easily attach and detach the cap to and from the headlight body 2.

Shown at 80 in FIG. 11 is the second deviation measuring unit, which is fitted in the bulb unit hole 5 of the reflector 4 when the unit is put in use. The unit 80 has cylindrical base body 83 and a horizontal surface 82a which is the top of the rear portion of the unit and which corresponds to the horizontal top 55a of the connector 55 of the electric bulb unit 50. A level 90 is secured to the horizontal surface 82a of the unit 80 so that the level is integrally coupled to the base body 83 of the unit. In the level 90, a liquid and a bubble 91 are hermetically filled in a straight glass tube graduated with straight lines 92 located on the surface thereof at intervals in the axial direction thereof. Except for the electric bulb 51 and the level 90, the second deviation measuring unit 80 and the electric bulb unit 50 have the same outer configuration. The base body 83 of the unit 80 has a flange 54, notches 54a, a front portion 56 of small diameter, an intermediate portion 57 of middle diameter, longitudinal slits 57a, a rear portion 58 of large diameter, and an O-ring 59, similar to the electric bulb unit 50.

When the second deviation measuring unit 80 is to be used, the electric bulb unit 50 is removed from the bulb unit hole 5 of the reflector 4 and the measuring unit is then fitted in the hole in the same way as the bulb unit. When the unit 80 is properly fitted in the hole 5, the level 90 is located at the top of the base body 83 of the unit. If the reflector 4 is properly oriented vertically, namely, the position of the headlight does not deviate upward or downward from the proper position, the bubble 91 of the level 90 will be located at a prescribed one of the straight lines 92. If the position of the reflector 4 or the headlight deviates upward or downward from the proper position thereof, the bubble 91 will be shifted from the prescribed straight line 92 by a distance corresponding to the amount of the deviation. For these reasons, it can be easily confirmed by the second deviation measuring unit 80 whether or not the position of the reflector 4 or the headlight deviates upward or downward from the proper aligned position. The reflector 4 or the headlight can be easily set in the proper position by turning the adjusting screw 30 to swing the reflector about the horizontal axis $L_z$.

Figure 12:
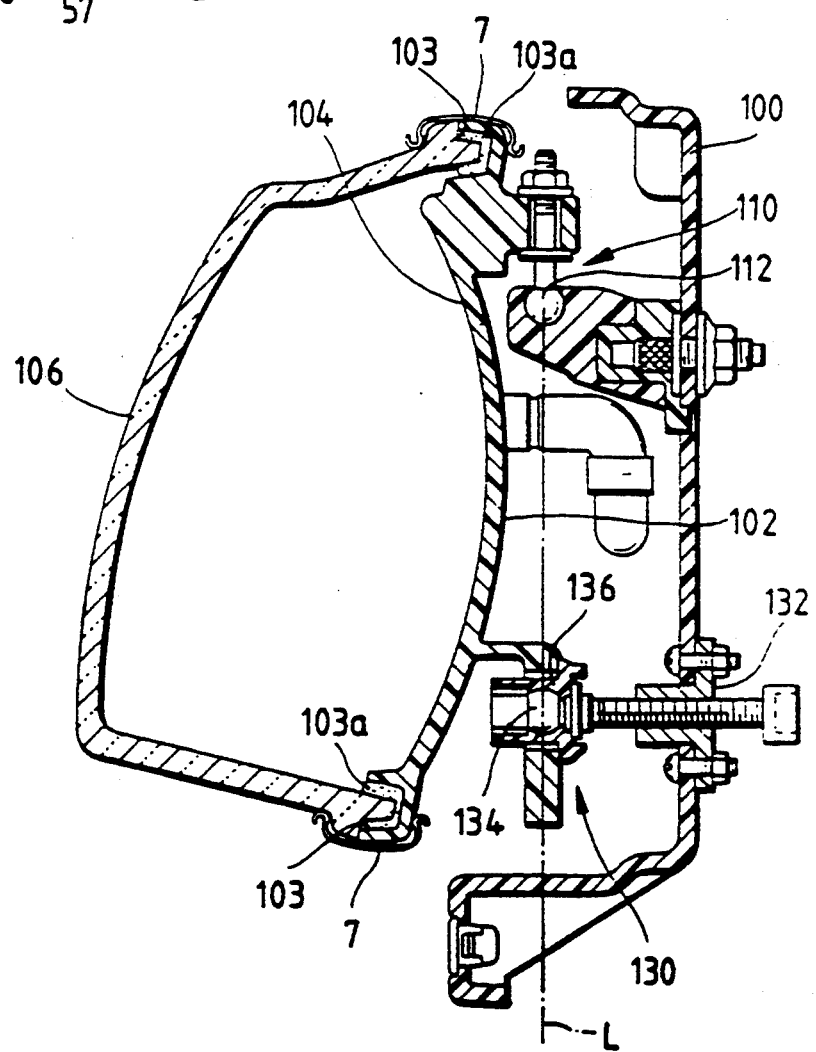
FIG. 12 is a vertical sectional view of a headlight of the movable unit type.
Figure 13:
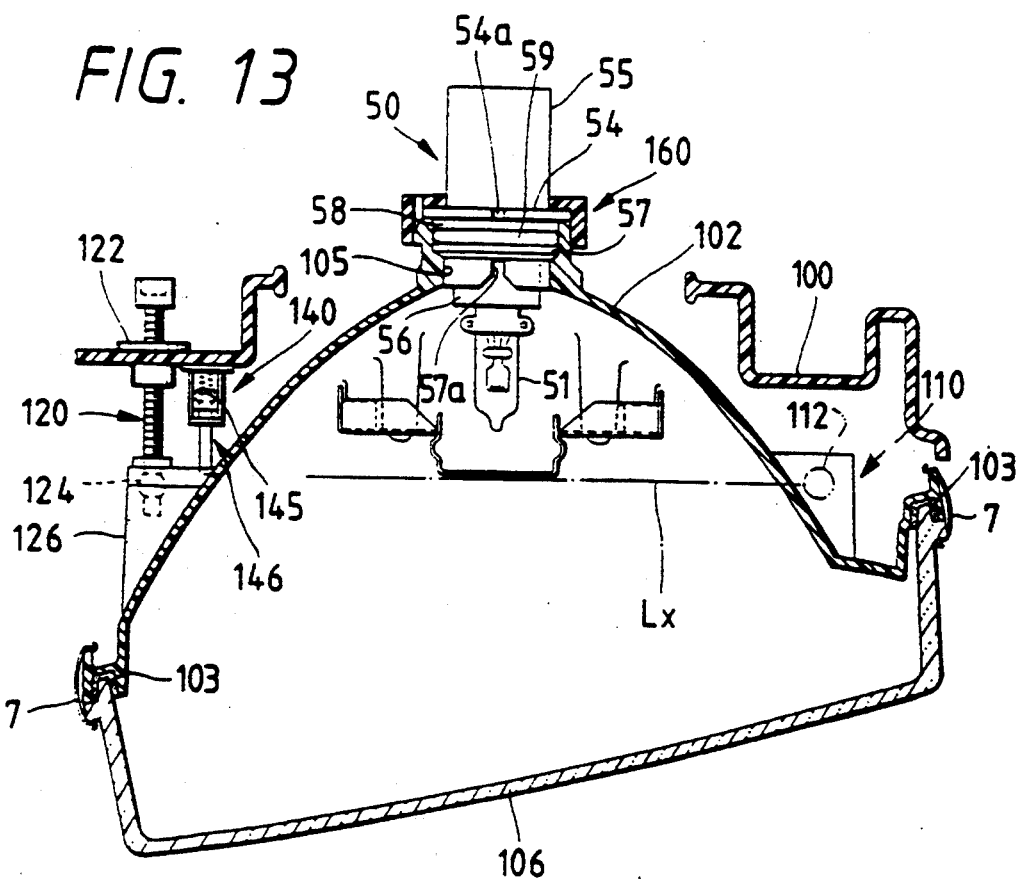
FIG. 13 is a horizontal sectional view of the headlight shown in FIG. 12.
Figure 14:
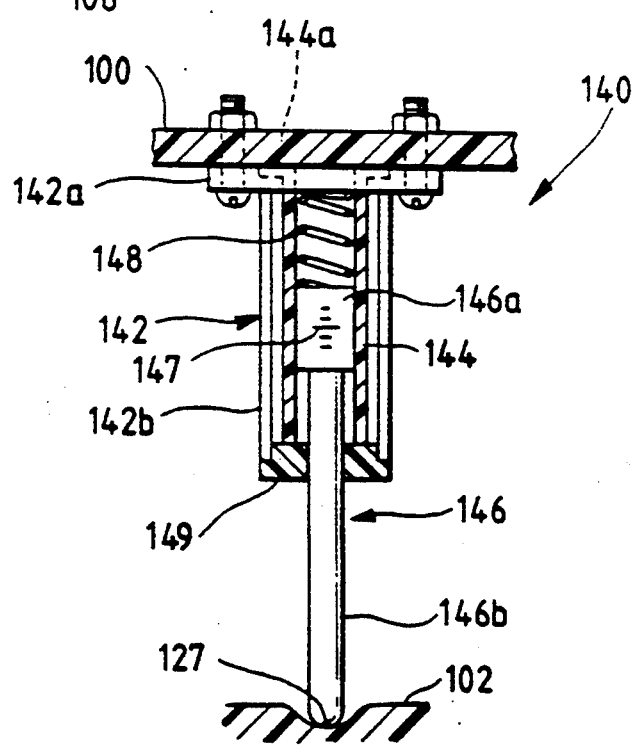
FIG. 14 is a horizontal sectional view of a first deviation measuring unit of a deviation measuring device of another embodiment of the present invention.
Figure 16:
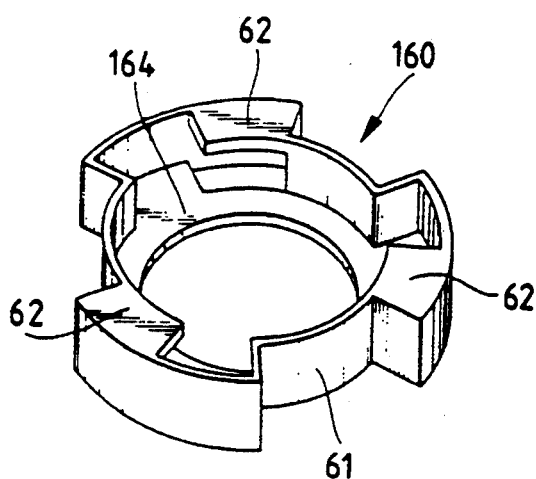
FIG. 16 is a perspective view of the locking cap of the headlight shown in FIG. 12.
Figure 15:
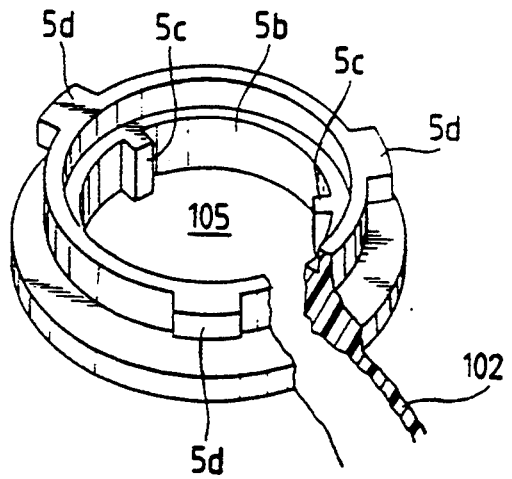
FIG. 15 is a perspective view of the bulb unit hole of the body of the headlight shown in FIG. 12.

FIGS. 12, 13, 14, 15 and 16 show a deviation measuring device intended for measuring the deviation of the orientation of a headlight of the movable unit type. FIG. 12 is a vertical sectional view of the headlight. FIG. 13 is a horizontal sectional view of the headlight. FIG. 14 is a horizontal sectional view of the first deviation measuring unit of the device. FIG. 15 is a cutaway perspective view of the bulb unit hole of the body of the headlight. FIG. 16 is a perspective view of the locking cap of the headlight. In the headlight, a front lens 106 is attached to the front of the body 102 of the headlight, and a reflector 104 is integrally provided on the inside spherical surface of the headlight body. The front lens 106 is fitted in the sealing groove 103 of the headlight body 102. A sealing agent 103a is filled in the sealing groove 103. The headlight body 102 is supported at three points, namely, by a ball joint 110 and adjusting screws 120 and 130, to the body 100 of a vehicle. The ball joint 110 and the adjusting screws 120 and 130 correspond to those 10, 20 and 30 of the preceding embodiment. The headlight body 102 can be swung about the vertical axis $L_y$ by turning the adjusting screw 120 to adjust the direction of the light beam from the headlight rightward or leftward. The headlight body 102 can be swung about the horizontal axis $L_x$ by turning the adjusting screw 103 to adjust the direction of the light beam from the headlight upward or downward. The screws 120 and 130 are engaged in bearings 122 and 132 secured to the vehicle body 100 so that the screws are moved backward and forward upon being turned. The screws 120 and 130 are provided with balls 124 and 134 at the front ends of the screws. The balls 124 and 134 are fitted in the sockets 126 and 136 of brackets to constitute ball joints. The ball joint 110 and the adjusting screws 120 and 130 are essentially the same in constitution and operation as those 10, 20 and 30 of the preceding embodiment, and are therefore not described in further detail herein.

The first deviation measuring unit 140 of this embodiment is used for measuring the amount of rightward or leftward deviation of the direction of the light beam from the headlight. The flange 142a of the outer cylindrical casing 142 of the unit 140 is secured to the vehicle body 100. The outer casing 142 has a semicylindrical portion 142b opened upward. The inner transparent casing 144 of the unit 140 is shaped as a tube of rectangular cross section and disposed in the outer casing 142 coaxially therewith. The flange 144a of the inner casing 144 is clamped on that 142a of the outer casing 142 so that the casings are coupled to each other. The stepped rod 146 of the unit 140 has a large-diameter portion 146a and a small-diameter portion 146b and is fitted in the inner casing 144 so that the rod is slidable in the axial direction thereof. A compressed coil spring 148 is interposed between the vehicle body 100 and the large-diameter portion 146a of the stepped rod 146. The small-diameter portion 146b of the rod 146 extends through an end plate 149 and is in contact with the outside surface of the headlight body 102 at the front end of the small-diameter portion. The inner casing 144 is marked with a reference line 145 as shown in FIG. 13. The large-diameter portion 146a of the rod 146 is provided with the graduations 147 as shown in FIG. 14. The amount of the rightward or leftward deviation of the orientation of the headlight body 102, or that of the rightward or leftward deviation of the direction of the light beam from the headlight, can be determined from the relationship between the reference line 145 and the graduations 147 by the use of the first deviation measuring unit 140 in the same way as the preceding embodiment.

The portion of the surface of the headlight body 102 which is in contact with the front end of the stepped rod 146 is a spherical surface, the center of curvature of which is coincident with the point of intersection of the axis of the rod and the horizontal axis $L_z$, similar to the first deviation measuring unit 40 of the preceding embodiment. As a result, the unit 140 is not affected by the upward or downward deviation of the orientation of the headlight body 102.

A bulb unit hole 105 shown in FIG. 15 is provided in the headlight body 102. The electric bulb unit 50 of the headlight is fitted in the bulb unit hole 105. The form of the hole 105 is entirely the same as that of the bulb unit hole 5, and a front annular part 5b, three inner projections 5c and outer projections 5d are provided around the hole 105 in the same manner as the preceding embodiment. Therefore, the bulb unit hole 105, the front annular part 5b, the inner projections 5c and the outer projections 5d in the present embodiment are not described in further detail herein.

Shown at 160 in FIGS. 13 and 16 is the locking cap which secures the electric bulb unit 50 in the bulb unit hole 105. The form of the locking cap 160 is essentially the same as that of the locking cap 60 of the preceding embodiment. The same portions of the locking cap 160 as those of the locking cap 60 are denoted by the same reference symbols as the latter and are not described in detail herein. The locking cap 160 has an inner flange 164 for pushing the flange 54 of the electric bulb unit 50. Although the locking cap 60 of the preceding embodiment has the outer flange 66 at the front end of the cap so as to push the rubber cover 70, the locking cap 160 of the present embodiment does not have such an outer flange because the headlight is not provided with such a rubber cover. Also, the locking cap 160 does not have ribs such as those 68 of the preceding embodiment.

The second deviation measuring unit 80 shown in FIG. 11 can be used with the present embodiment. The unit 80 is fitted in the bulb unit hole 105 of the headlight body 102 instead of the electric bulb unit 50 so as to determine whether or not the orientation of the headlight body deviates upward or downward, that is, whether the direction of the light beam from the headlight deviates upward or downward, and the amount of any such deviation. Therefore, the second deviation measuring unit 80 can be used not only for the headlight of the movable reflector type, but also for the headlight of the movable unit type.

In a device provided in accordance with the present invention to measure the amount of deviation of the orientation of a headlight of the movable reflector type for a motor vehicle, the rightward or leftward deviation of the orientation corresponds to the axial displacement of the rod of the first deviation measuring unit of the device so that the amount of rightward or leftward deviation can be determined in terms of the position of the rod relative to the body of the headlight. When the second deviation measuring unit of the device is attached to the reflector of the headlight instead of the electric bulb unit, the amount of the upward or downward deviation of the orientation of the headlight can be determined by the level of the second deflection measuring unit. For these reasons, it can be easily confirmed by a device of simple construction whether or not the light beam from the headlight is oriented in the proper direction.

In a device provided in accordance with the present invention for measuring the amount of deviation of the orientation of a headlight of the movable unit type for a motor vehicle, the amount rightward or leftward deviation of the orientation of the body of the headlight corresponds to the amount of axial displacement of the rod of the first deviation measuring unit of the device so that the amount of the rightward or leftward deviation can be determined in terms of the position of the rod relative to the headlight mounting surface of the body of the vehicle. When the second deflection measuring unit of the device is attached to the body of the headlight instead of the electric bulb unit, the quantity of the upward or downward deviation of the orientation of the body of the headlight can be measured using the level of the unit. For these reasons, it can be easily confirmed by a device of simple construction whether or not the light beam from the headlight deviates from the proper direction.

The values measured by the first and second deflection measuring units of each of the devices can be easily made zero by the aiming adjustment of the headlight so as to correct any such deviation.

Further embodiments of the present invention are hereafter described with reference to the attached drawings.

Figure 17:
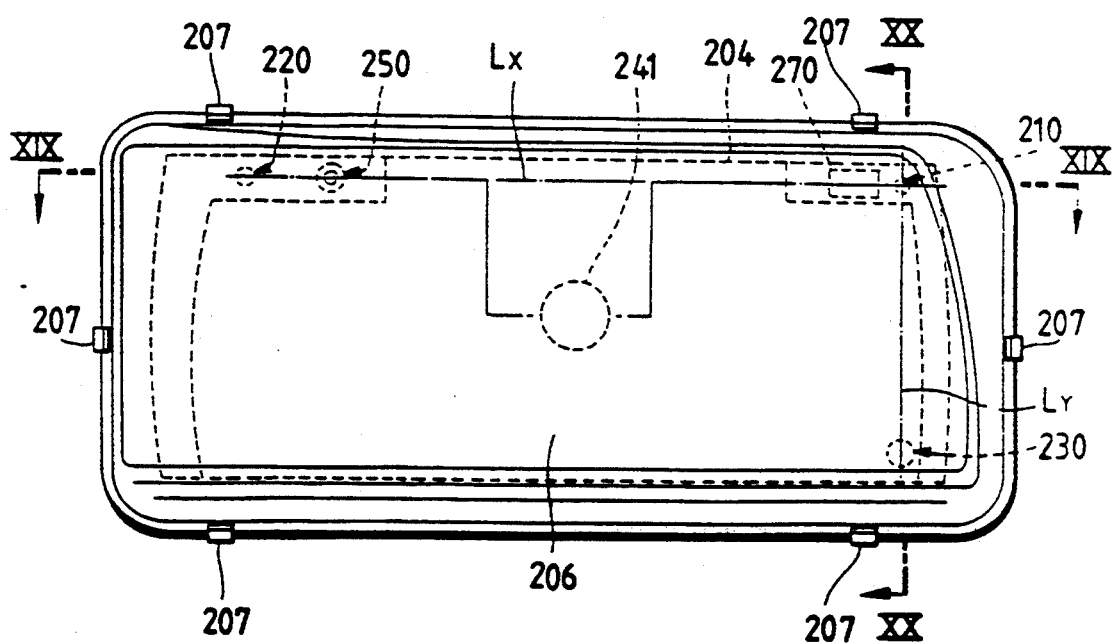
FIG. 17 is a front view of a headlight of the movable reflector type and in which another embodiment of a device of the present invention for adjusting the direction of the light beam from the headlight is provided.
Figure 18:
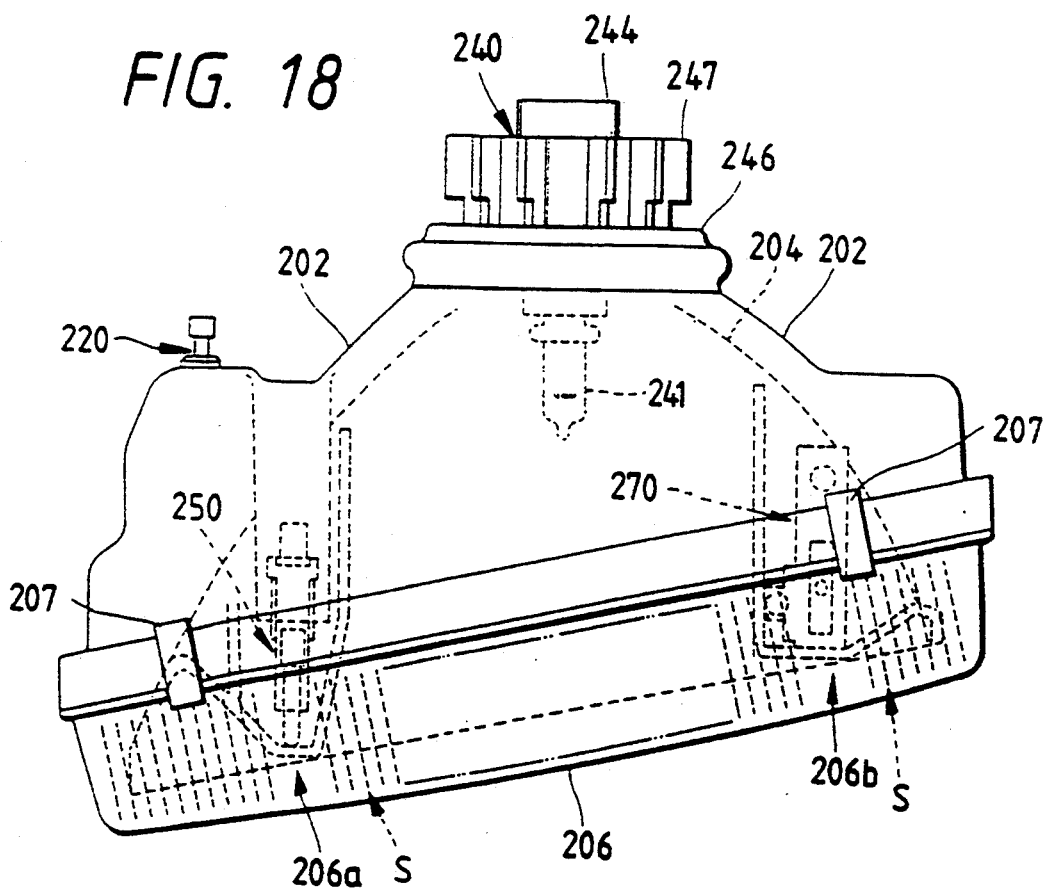
FIG. 18 is a plan view of the headlight of FIG. 17.
Figure 19:
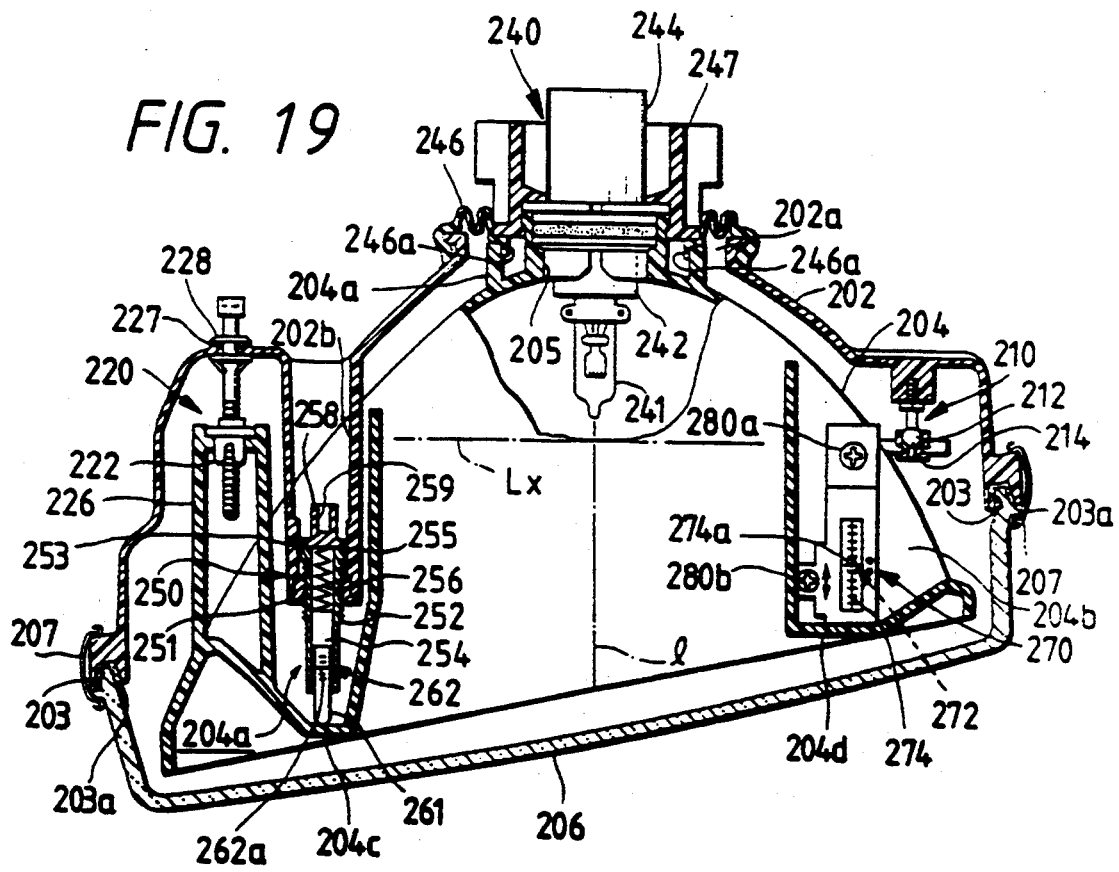
FIG. 19 is a sectional view of the headlight taken along a line XIX—XIX in FIG. 17.
Figure 20:
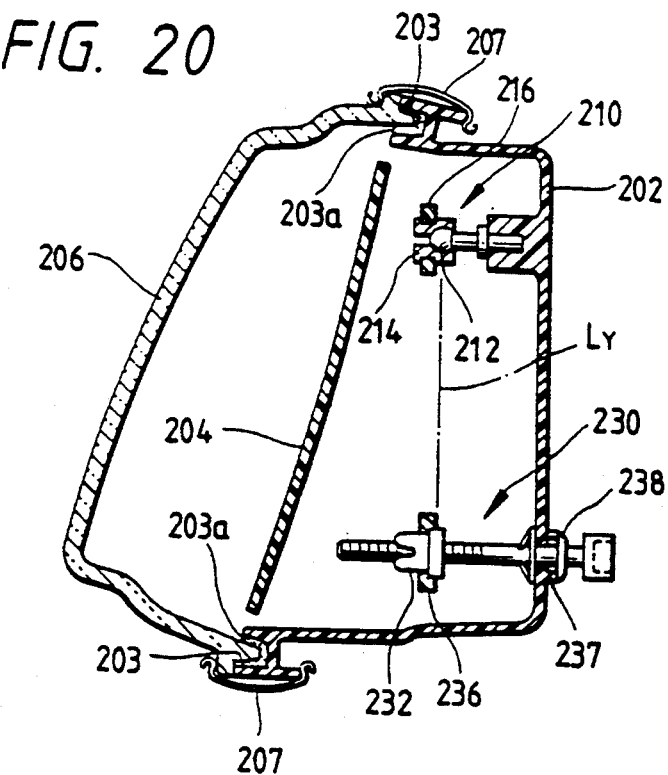
FIG. 20 is a sectional view of the headlight taken along a line XX—XX in FIG. 17.
Figure 21:
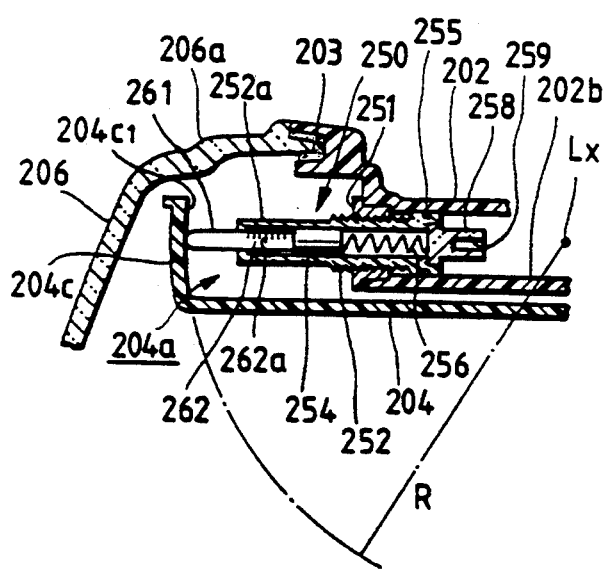
FIG. 21 is a vertical sectional view of the first deviation measuring unit of the device of FIG. 17.
Figure 22:
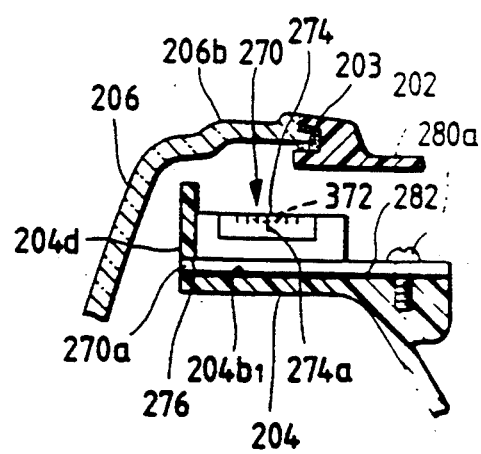
FIG. 22 is a vertical sectional view of the portion of the headlight of FIG. 17 at which the second deviation measuring unit of the device is provided.
Figure 23:
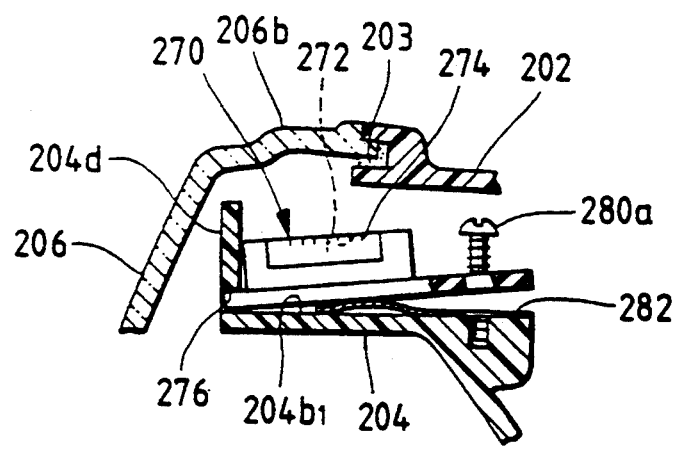
FIG. 23 is a sectional view of the second deviation measuring unit of the headlight of FIG. 17.
Figure 24:
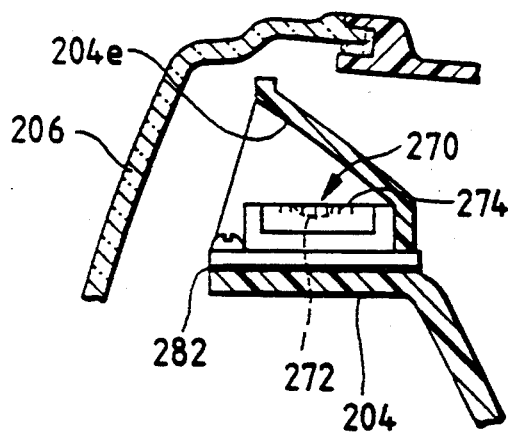
FIG. 24 is a sectional view of the second deviation measuring unit of a device of another embodiment of the present invention and which is used for adjusting the direction of the light beam from a headlight of the movable reflector type.
Figure 25:
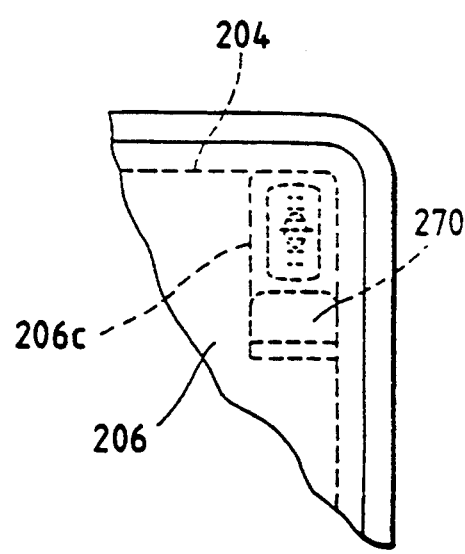
FIG. 25 is a partial front view showing how mirror images of the graduations of the second deviation measuring unit shown in FIG. 24 are seen through the front lens of the headlight.

FIGS. 17-25 show a device for adjusting the direction of the light beam from a headlight of the movable reflector type for a vehicle constructed in accordance with another embodiment of the invention. FIG. 17 is a front view of the headlight provided with the device. FIG. 18 is a plan view of the headlight. FIG. 19 is a cutaway horizontal sectional view of the headlight. FIG. 20 is a vertical sectional view of the headlight. FIG. 21 is a vertical sectional view of a first deviation measuring unit of the device. FIG. 22 is a vertical sectional view of a part of the headlight in which the second deviation measuring unit of the device is incorporated. FIG. 23 is a view for describing the assembled state of the second deviation measuring unit. FIG. 24 is a vertical sectional view of the second deviation measuring unit of a direction adjusting device of still another embodiment of the invention. FIG. 25 is a view showing the mirror image of the second deviation measuring unit as through the front lens of the headlight.

Shown at 202 in the drawings is the body of the headlight whose reflector 204 is provided inside the body. The front lens 206 of the headlight is attached to the headlight body 202 at the rectangular front opening thereof so that the lens is integrally coupled to the headlight body. As shown in FIGS. 17, 19 and 20, the reflector 204 is supported at three points by a ball joint 210 and adjusting screws 220 and 230. The ball joint 210 is supported at the ball 212 thereof by the headlight body 202 so that the reflector 204 can be swung about the ball joint. The adjusting screws 220 and 230 are rotatably supported by the headlight body 202 and engaged in nuts 222 and 232 coupled to the reflector 204 so that the nuts can be moved forward or backward along the screws by turning the screws to change the orientation of the reflector 204. A socket member 214 supports the ball 212 of the ball joint 210 and is secured to a bracket 216 fixed to the rear surface of the reflector 204. The nuts 222 and 232 are supported by brackets 226 and 236 secured to the rear surface of the reflector 204. Compressed coil springs 224 and 234, O-rings 227 and 237, and flanges 228 and 238 projecting from the adjusting screws 220 and 230 are also provided.

The point of support of the reflector 204 by the adjusting screws 220, which is the point at which the screw is engaged in the nut 222, is located on a horizontal axis $L_x$ perpendicular to the optical axis 1 of the electric bulb 241 of the headlight and extending through the ball joint 210. The point of support of the reflector by the other adjusting screw 230, which is the point at which the screw is engaged in the nut 232, is located on a vertical axis $L_y$ perpendicular to the optical axis 1 and extending through the ball joint 210. With this construction, the reflector 204 can be swung about the vertical axis $L_y$ by turning the adjusting screw 220 to correct right or leftward deviation of the orientation of the reflector 202, that is, to adjust the direction of the light beam from the headlight righward or leftward. The reflector 204 also can be swung about the horizontal axis $L_x$ perpendicular to the vertical axis by turning the other adjusting screw 230 to correct upward or downward deviation of the orientation of the reflector, that is, to adjust the direction of the light beam from the headlight upward or downward.

Shown at 240 in FIG. 19 is a bulb socket member to which the electric bulb 241 is integrally coupled. The rear portion of the headlight body 202 has a bulb socket member opening 202a through which the bulb socket member 240 is fitted into the socket member hole 205 of the rear portion of the reflector 204. A rubber cover 246 is attached to the reflector 204 around the socket member hole 205 thereof so that the gap between the reflector and the headlight body 202 is closed. A locking cap 247 is provided around the bulb socket member 240 so that the bulb socket member is secured in the socket member hole 205 of the reflector 204 by pressure and the inner circumferential edge 246a of the rubber cover 246 is tightly fitted on the circumferential part 204a of the rear portion of the reflector by pressure. A cylindrical connector 244, in which terminals are provided, is coupled to the base 242.

Shown at 204 in FIGS. 19 and 20 is a sealing groove provided in the headlight body 202 around the front opening thereof. The peripheral portion of the front lens 206 of the headlight is fitted in the sealing groove 203. A sealing agent 203a is filled in the sealing groove 203. A clip 207 mechanically clamps the front lens 206 onto the headlight body 202.

Shown at 250 in FIGS. 17, 18, 19 and 21 is the first deviation measuring unit, which is mounted in a horizontal plane containing the horizontal axis $L_x$. The first deviation measuring unit is used to measure the amount of rightward or leftward deviation of the orientation of the reflector 204. A cylindrical projection 202b integrally formed on the headlight body 202 extends into the recess 204a of the reflector 204 located inside the headlight body. The recess 204a is located at the upper right-hand corner of the reflector 204. The first deviation measuring unit 250 is provided in the projection 202b and extends parallel to the optical axis 1. The unit 250 includes a cylindrical support member 252, a rod 254 inserted into the support member, and a compressed coil spring 256 provided in the support member and urging the rod forward. A tapped member 251 is secured in the front end of the projection 202b. The male screw of the support member 252, which is made of a transparent synthetic resin, is engaged in the tapped member 251. The support member 252 has a large-diameter end portion 253 fitted with an O-ring 255 on the outside circumferential surface of the portion so that the gap between the inside circumferential surface of the projection 202b and the outside circumferential surface of the support member, which is slidable on the inside circumferential surface, is closed. A cap 258 having a screwdriver-engaging portion 259 is fuse-bonded to the large-diameter end portion 253 of the support member 252 so that the cap is integrally coupled thereto. With this arrangement, the support member 252 can be turned relative to the tapped member 251 using a screwdriver (not shown in the drawings) to move the support member backward and forward in the axial direction thereof relative to the headlight body 202 to adjust the position of the support member. The rod 254 which is inserted in the support member 252 is a stepped rod urged by the compressed coil spring 256 so that the small-diameter portion 261 of the rod projects forward in contact with the rear surface of the vertical portion 204c of the reflector 204. The outside circumferential surface of the front end portion of the support member 252 is marked with a reference line 252a extending along the circumference of the member. The small-diameter portion 261 of the stepped rod 254 is provided with straight graduations 262 located at predetermined intervals in the axial direction of the rod. When the reflector 204 is swung about the vertical axis $L_y$, the rod 254 is slid forward or backward in the axial direction thereof so that the positional relationship between the reference line 252a and the graduations 262 changes. As shown in FIG. 21, the portion 204c, of the surface of the vertical wall 204c which is in contact with the small-diameter portion 261 of the stepped rod 254 is a curved surface, the radius of curvature of which is R and the center of curvature of which lies on the horizontal axis $L_x$. There, the graduations 262 of the first deviation measuring unit 250 are not displaced by upward or downward deviation of the orientation of the reflector 204. Presetting is performed so that the position of the zero-indicating one 262a of the graduations 262 is coincident with that of the reference line 252a when the reflector 204 is properly oriented rightward or leftward. The graduation 262 located at the reference line 252a indicates the amount of the rightward or leftward deviation of the orientation of the reflector 204. The reference line 252a for reading the graduations 262 is located near the unstepped area 206a of the upper part of the peripheral portion of the front lens 206. As shown in FIG. 18, the inside surface of the peripheral portion of the lens 206 is provided with diffusion steps S extending nearly parallel to the optical axis 1 and located at prescribed intervals so that the leakage of light from the peripheral portion is not conspicuous. The area 206a of the upper part of the peripheral portion of the front lens 206 is located so as to correspond to the first deviation measuring unit 250 and does not have such diffusion steps so that the positional relationship between the reference line 252a and the graduations 262, which corresponds to the amount of the rightward or leftward deviation of the orientation of the reflector 204, can be seen through the unstepped area 206a.

Shown at 270 in FIGS. 17, 18, 19 and 22 is the second deviation measuring unit, which is a level disposed in a horizontal plane containing the horizontal axis $L_x$ and which is used to measure the amount of upward or downward deviation of the orientation of the reflector 204. In the level 270, a liquid having a bubble 272 is hermetically filled in a straight transparent tube.

The reflector 204 has a recess 204b at the upper right-hand corner of the reflector. The recess 204b has a horizontal bottom 204b. The level 270 is secured at the bottom 204b₁ of the recess 204b so that the straight graduations 274 of the level extend parallel to the optical axis l. The end 270a of the level 270 is engaged in the engagement opening 276 of the vertical wall 204d of the reflector 204 at the recess 204b thereof. The level 270 is secured to the reflector 204 by screws 280a and 280b. A plate spring 282 is interposed between the level 270 and the bottom 204b, of the recess 204b. The degree of horizontality of the level 270 can be adjusted by adjusting the screw 280a. Presetting is performed so that the bubble 272 of the level 270 is located at the zero-indicating one 274a of the straight graduations 274 when the reflector 204, or the light beam from the headlight, is properly oriented upward or downward. The other unstepped area 206b of the upper part of the peripheral portion of the front lens 206 corresponds to the level 270 so that the positional relationship between the bubble 272 of the level and the straight graduations 274 thereof, which corresponds to the amount of the upward or downward deviation of the orientation of the reflector 204, that is, the amount of upward or downward deviation of the direction of the light beam from the headlight, can be seen through the unstepped area.

FIG. 24 shows the second deviation measuring unit of another embodiment. The portion of the reflector 204 on which the level 270 of the second deviation measuring unit is mounted is open at the front of the portion and formed with a plane mirror 204a with which the image of the bubble and graduations of the level are reflected so that the reflected images of the bubble and the graduations can be seen through the unstepped area 206c of the front lens 206 as shown in FIG. 25. As a result, the positional relationship between the bubble and the graduations, which corresponds to the amount of the upward or downward deviation of the orientation of the reflector 204, can be observed looking through the front lens 206.

The procedures for adjusting the first and the second deviation measuring units at the time of mounting of headlight to the body of the vehicle, and a procedure for adjusting the orientation of the headlight after the adjustment of the measuring units will now be described.

If the zero-indicating graduation 262a of the rod 254 of the first deviation measuring unit 250 is made coincident with the reference line 252a of the support member of the unit, the light beam from the headlight prior to being mounted on the vehicle body will be properly oriented rightward or leftward relative to the body of the headlight. If the bubble 272 of the level 270, which is the second deviation measuring unit, is made coincident with the zero-indicating graduation 274a thereof, the light beam from the headlight before mounting on the vehicle body will be properly oriented upward or downward relative to the body of the headlight. When the headlight in which the first and the second deviation measuring units 250 and 270 are incorporated on the body of the vehicle, the graduations of the measuring units are not necessarily located in proper positions because of dimensional inaccuracies and the like, and therefore they must be adjusted to the proper positions. For the adjustment of the graduations of the first deviation measuring unit 250, an optical aimer is disposed to properly face the body of the vehicle, and the optical axis of the headlight is made coincident with the axis of the corresponding part of the vehicle body by turning the adjusting screws 220 and 230. At that time, the position of the reference line 252a of the unit 250 and that of the zero-indicating graduation 262a thereof do not necessarily coincide with each other due to inaccuracies in the headlight mounting surface of the vehicle body or the like. The support member 252 of the measuring unit 250 is then turned by the screwdriver so that the member is moved forward or backward in the axial direction thereof to cause the position of the zero-indicating graduation 262a to coincide with that of the reference line 252a. The light beam from the headlight is thus properly oriented rightward or leftward. As a result, the graduation 262a, coincident with the reference line 252a in position, indicates the zero point of the first deviation measuring unit 250. When the headlight is mounted on the vehicle body, the position of the bubble 272 of the second deviation measuring unit 270 does not necessarily coincide with that of the zero-indicating graduation 274a due to the inaccuracies of the headlight mounting surface of the vehicle body or to the like. The adjusting screw 230 and, if necessary, the securing screw 280, are then turned so that the position of the bubble 272 is made coincident with that of the zero-indicating graduation 274a. The light beam from the headlight is thus properly oriented upward or downward. As a result, the bubble 272 indicates the zero point of the second deviation measuring unit 270. If it is thereafter seen through the front lens 206 of the headlight by the user that the position of the reference line 252a of the first deviation measuring unit 250 is not coincident with that of the zero-indicating graduation 262a thereof and/or the position of the bubble 272 of the second deviation measuring unit 270 is not coincident with that of the zero-indicating graduation 274a thereof, the user can read the amount of the rightward or leftward deviation and/or upward or downward deviation of the orientation of the reflector of the headlight, or the amount of deviation of the direction of the light beam from the headlight, in terms of the difference between the positions of the reference line 252 and the zero-indicating graduation 262a and/or that between the positions of the bubble 270 and the zero-indicating graduation 274a. The user can turn the adjusting screw 220 to make the position of the reference line 252a of the first deviation measuring unit 250 coincident with that of the zero-indicating graduation 262a thereof to adjust the orientation of the reflector, namely, the direction of the light beam from the headlight, rightward or leftward, and/or can turn the other adjusting screw 230 to make the position of the bubble 272 of the second deviation measuring unit 270 coincident with that of the zero-indicating graduation 274a thereof to adjust the orientation of the reflector or the direction of the light beam from the headlight upward or downward.

Figure 26:
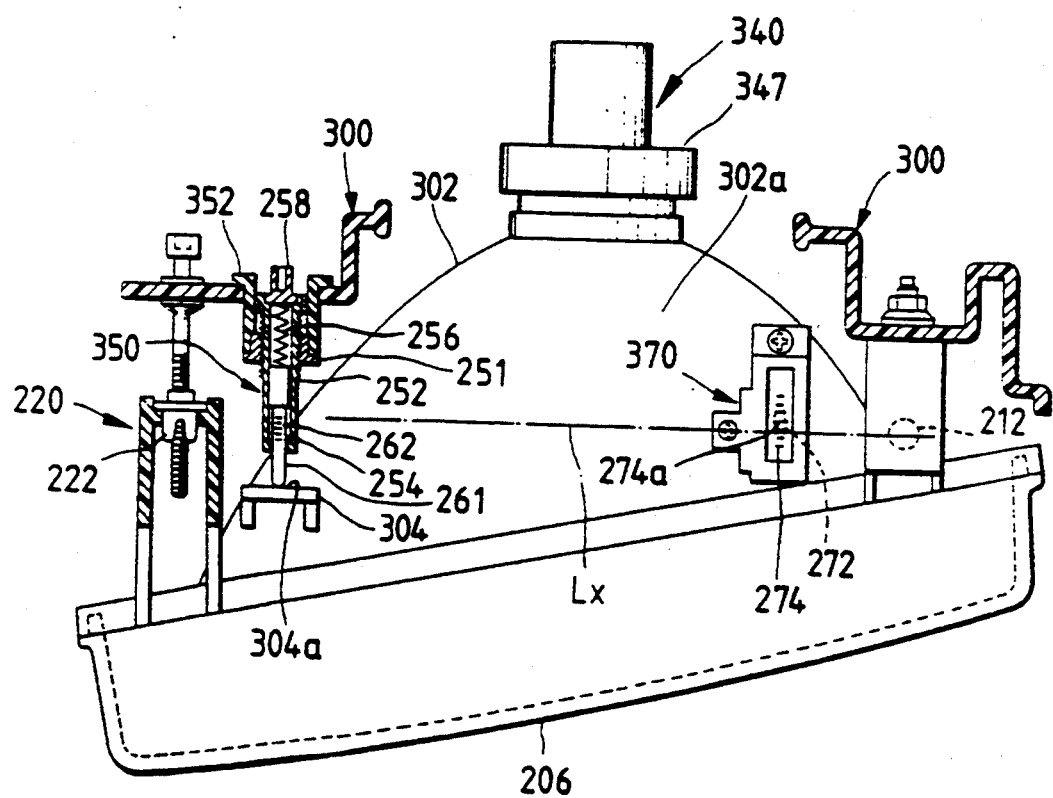
FIG. 26 is a horizontal sectional view of a headlight of the movable unit type and in which a device of yet another embodiment of the present invention for measuring and adjusting the direction of the light beam from the headlight is incorporated.

FIG. 26 shows a device for adjusting the direction of the light beam from a headlight of the movable unit type constructed according to yet another of the embodiments. In this device, a first deviation measuring unit 350 for measuring the amount of rightward or leftward deviation of the orientation of the body 302 of the headlight and a second deviation measuring unit 370 for measuring the amount of upward or downward deviation of the orientation of the body of the headlight are included, which units are disposed at the upper portion 302a of the headlight body and positioned in a horizontal plane containing the horizontal axis $L_x$ about which the headlight body is swingably moved for adjustment. The first deviation measuring unit 350 includes a transparent support member 252, a holder 352 for attaching the support member to the headlight mounting surface of the body 300 of the vehicle, and a rod 254 provided with graduations and urged into contact with the vertical part 304 of the upper portion 302a of the headlight body 302. The portion 304a of the surface of the vertical part 304 which is in contact with the small-diameter portion 261 of the rod 254 is a curved surface, the center of curvature of which lies on the horizontal axis $L_x$. For that reason, the position of the rod 254 is not affected by swinging the headlight body 302 upward and downward about the horizontal axis $L_x$. The graduations of the first and the second deviation measuring units 350 and 370 are located so that the graduations can be easily seen when looking downward through the peripheral portion of the headlight. Shown at 340 and 347 in FIG. 26 are an electric bulb socket member and a locking cap for securing the member in a socket member hole, respectively. Since the other portions of the device are the same in construction and operation as the above-described device for the headlight of the movable reflector type, those portions are denoted by the same reference numerals or symbols and are not described herein in further detail.

In a device provided in accordance with the present invention for adjusting the direction of the light beam from a headlight of the movable reflector type, the amount of rightward or leftward deviation of the orientation of the reflector of the headlight corresponds to the amount of axial displacement of the rod of the first deviation measuring unit of the device so that the amount of rightward or leftward deviation of the orientation of the reflector can be determined in terms of the position of the rod relative to the body of the headlight. The amount of upward or downward deviation of the orientation of the reflector corresponds to the amount of axial displacement of the bubble of a level, which forms the second deviation measuring unit of the device, so that the amount of upward or downward deviation of the orientation of the reflector can be determined in terms of the position of the bubble. The first and the second deviation measuring units are disposed on the upper portion of the reflector so that they can be easily seen through the front lens of the headlight to judge whether or not the direction of the light beam from the headlight is proper. If the direction of the light beam from the headlight is not judged to be proper, the direction can be easily adjusted by swingably adjusting the reflector rightward or leftward to make the positions of the reference line and zero-indicating graduation of the first deviation measuring unit coincident with each other, and/or by swingably adjusting the reflector upward or downward to make the positions of the bubble and zero-indicating graduation of the second deviation measuring unit coincident with each other.

In a device provided in accordance with the present invention for adjusting the direction of the light beam from a headlight of the movable unit type for a motor vehicle, the amount of rightward or leftward deviation of the orientation of the body of the headlight corresponds to the amount of axial displacement of the rod of the first deviation measuring unit of the device so that the amount of rightward or leftward deviation of the orientation of the headlight body can be determined in terms of the position of the rod relative to the headlight mounting surface of the body of the vehicle. The upward or downward deviation of the orientation of the body of the headlight corresponds to the amount of axial displacement of the bubble of a level, which forms the second deviation measuring unit of the device, so that the amount of upward or downward deviation of the orientation of the headlight body can be determined in terms of the position of the bubble. The first and the second deviation measuring units are disposed on the upper portion of the headlight body so that they can be easily seen so as to judge whether or not the direction of the light beam from the headlight is proper. If the direction of the light beam from the headlight is not judged to be proper, the direction can be easily adjusted by swingably adjusting the body of the headlight rightward or leftward to make the positions of the reference line and zero-indicating graduation of the first deviation measuring unit coincident with each other, and/or by swingably adjusting the body of the headlight upward or downward to make the positions of the bubble and zero-indicating graduation of the second deviation measuring unit coincident with each other.

While preferred embodiments of the invention have been described in detail, it will be evident to those skilled in the art that the invention may be embodied otherwise without departing from its spirit and scope.

What is claimed is:

1. A headlight aiming apparatus for attachment to an automotive headlamp apparatus comprising a support member which is rigidly mountable to an automotive vehicle, a reflector which is mounted to the support member for pivotal motion about at least one of a horizontal axis and vertical axis for aiming of the headlamp beam, and headlamp adjusting means operatively coupled with said headlamp for producing movement of said reflector relative to said support member for aiming of the headlamp beam; said aiming apparatus comprising: aim-indicating means comprising a first aiming indicia movable in unison with said headlamp adjusting means and a second aiming indicia mounted to a surface which does not move either when the reflector is adjusted or inadvertently goes out of adjustment or when the headlamp adjusting means is adjusted, such that said second aiming indicia is independent of said headlamp adjusting means and of the adjustment of said reflector; and indicator alignment means for moving one of said first and second indicia independently of said headlamp adjusting means for bringing the first and second aiming indicia into registry with each other when the reflector is in a condition wherein the beam is aimed as desired responsive to adjustment by said headlamp adjusting means; whereby said headlamp adjusting means may be adjusted thereafter as necessary until said aim-indicating means indicates said aimed condition to thereby assure proper subsequent aiming of the headlamp beam.

2. The apparatus of claim 1 said aim-indicating means comprises a housing mounted closely adjacent said adjusting means, an elongate cavity generally defined within said housing, an indicator member mounted for slidable movement relative to said cavity and wherein said first aiming indicia comprises first indicia means on said indicator member; resilient means for urging said indicator member into engagement with a given surface of said reflector such that the headlamp adjusting means will operate to move the indicator member relative to the housing such that said indicatia means thereon is also moved in unison with said reflector.

3. Apparatus according to claim 2 wherein said second aiming indicia comprises second indicia means alignable with said first indicia means when said headlamp is in the desired aimed condition.

4. Apparatus according to claim 2 wherein said first indicia means comprises an indicia mark affixed to a surface of said indicator member and wherein said second aiming indicia comprises second indicia means alignable with said indicia mark when said headlamp is in an aimed condition.

5. Apparatus according to claim 4 wherein said alignment means includes means for moving said second indicia means for aligning the same with said indicia mark when said headlamp beam is in said desired aimed condition.

6. Apparatus according to claim 5 wherein said alignment means comprises a threaded surface on said housing generally coaxial with the axis of movement of said indicator member relative thereto, for movement of said housing along said axis for aligning said complementary indicia with said indicia mark.

7. Apparatus according to claim 2 and further including cooperating retaining means on said indicator means and on said housing for retaining at least a portion of said indicator means within said housing and for defining a limit of movement of said indicator means in a direction outwardly of said housing.

8. A headlight aiming apparatus for attachment to an automotive headlamp assembly comprising a frame member which is rigidly mountable to an automotive vehicle, a headlamp which is mounted to the frame member for pivotal motion about at least one of a horizontal axis and a vertical axis for aiming of the headlamp beam, and headlamp adjusting means operatively coupled with said headlamp for producing movement of said headlamp relative to said frame member for aiming of the headlamp beam; said aiming apparatus comprising: aim-indicating means comprising a first aiming indicia movable in unison with said headlamp adjusting means and a second aiming indicia mounted to a surface which does not move either when the headlamp is adjusted or inadvertently goes out of adjustment or when the headlamp adjusting means is adjusted, such that said second aiming indicia is independent of said headlamp adjusting means and of the adjustment of said headlamp; and indicator alignment means for moving one of said first and second indicia independently of said headlamp adjusting means for bringing the first and second aim indicia means into registry with each other when the headlamp is in a condition wherein the beam is aimed as desired responsive to adjustment by said headlamp adjusting means; whereby said headlamp adjusting means may be adjusted thereafter as necessary until said aim-indicating means indicates said aimed condition to thereby assure proper subsequent aiming of the headlamp beam.

* * * * *